(12) United States Patent
MacMorran

(10) Patent No.: US 10,513,299 B2
(45) Date of Patent: Dec. 24, 2019

(54) ADJUSTABLE BICYCLE RACK

(71) Applicant: Henry Gordon MacMorran, Redondo Beach, CA (US)

(72) Inventor: Henry Gordon MacMorran, Redondo Beach, CA (US)

( * ) Notice: Subject to any disclaimer, the term of this patent is extended or adjusted under 35 U.S.C. 154(b) by 0 days.

(21) Appl. No.: 15/727,625

(22) Filed: Oct. 8, 2017

(65) Prior Publication Data

US 2019/0106169 A1 Apr. 11, 2019

(51) Int. Cl.
*B62H 5/00* (2006.01)
*B62J 7/04* (2006.01)
*B62J 9/00* (2006.01)

(52) U.S. Cl.
CPC ............... *B62H 5/001* (2013.01); *B62J 7/04* (2013.01); *B62J 9/001* (2013.01)

(58) Field of Classification Search
CPC ............. B62H 5/001; B62J 9/001; B62J 7/04
USPC ................................................. 224/451, 452
See application file for complete search history.

(56) References Cited

U.S. PATENT DOCUMENTS

| | | | |
|---|---|---|---|
| 2,536,570 A | 1/1951 | Rehn et al. | |
| 2,776,790 A | 1/1957 | Zbikowski et al. | |
| 4,154,382 A * | 5/1979 | Blackburn | B62J 7/04 224/445 |
| 4,174,795 A | 11/1979 | Jackson et al. | |
| 4,266,702 A | 5/1981 | Jackson et al. | |
| 4,350,361 A * | 9/1982 | Fujii | B62J 7/06 224/422 |
| 4,353,490 A | 10/1982 | Jackson et al. | |
| 4,383,625 A * | 5/1983 | Kiang | B62J 7/04 224/424 |
| 4,410,116 A * | 10/1983 | Mattei | B62J 7/04 224/424 |
| 4,429,818 A * | 2/1984 | Patterson | B62J 7/04 224/422 |
| 4,562,944 A | 1/1986 | Jackson et al. | |
| 4,666,071 A | 5/1987 | Irwin et al. | |
| 4,671,438 A | 6/1987 | La Plante | |
| 4,760,943 A | 8/1988 | Bass et al. | |
| 5,090,717 A | 2/1992 | Belka | |
| 5,195,670 A | 3/1993 | Piretti et al. | |
| D336,877 S | 6/1993 | Fenton | |
| 5,257,727 A * | 11/1993 | Chen | B62J 7/04 224/424 |
| 5,332,134 A | 7/1994 | Chen | |
| 5,340,003 A * | 8/1994 | Wilson | B62J 7/08 224/415 |
| 5,411,190 A * | 5/1995 | Kortenbrede | B62J 7/04 224/422 |
| 5,639,001 A | 6/1997 | Brady et al. | |
| 5,687,894 A | 11/1997 | Cavallaro | |

(Continued)

FOREIGN PATENT DOCUMENTS

| | | |
|---|---|---|
| CA | 2782526 A1 | 6/2011 |
| EP | 0636534 A1 | 2/1995 |
| EP | 1705109 A1 | 9/2006 |

*Primary Examiner* — Nathan J Newhouse
*Assistant Examiner* — Lester L Vanterpool
(74) *Attorney, Agent, or Firm* — Henricks Slavin LLP

(57) ABSTRACT

A rack for use with a two or three-wheeled vehicle including a platform defining a length and a width, at least one of the length and the width of the platform being adjustable, and a platform support, operably connected to the platform, configured to be secured to the two or three-wheeled vehicle.

5 Claims, 5 Drawing Sheets

(56) References Cited

U.S. PATENT DOCUMENTS

| | | | |
|---|---|---|---|
| 5,803,329 | A | 9/1998 | Weissenberger et al. |
| 6,015,074 | A | 1/2000 | Snavely et al. |
| 6,568,699 | B2 | 5/2003 | McCann |
| 8,201,719 | B2 * | 6/2012 | Hsu .......................... B62J 7/04 224/424 |
| 8,365,969 | B2 * | 2/2013 | Johnson .................... B60R 9/08 190/14 |
| 2005/0224546 | A1 | 10/2005 | Rak |
| 2008/0296329 | A1 | 12/2008 | Guckes |
| 2009/0159626 | A1 | 6/2009 | Hoidal et al. |
| 2009/0194569 | A1 | 8/2009 | Bennison |
| 2011/0132949 | A1 | 6/2011 | Vitanza |
| 2012/0061434 | A1 | 3/2012 | Giguere et al. |
| 2014/0263510 | A1 | 9/2014 | Ton et al. |
| 2016/0362155 | A1 * | 12/2016 | Ton .......................... B62J 7/04 |

* cited by examiner

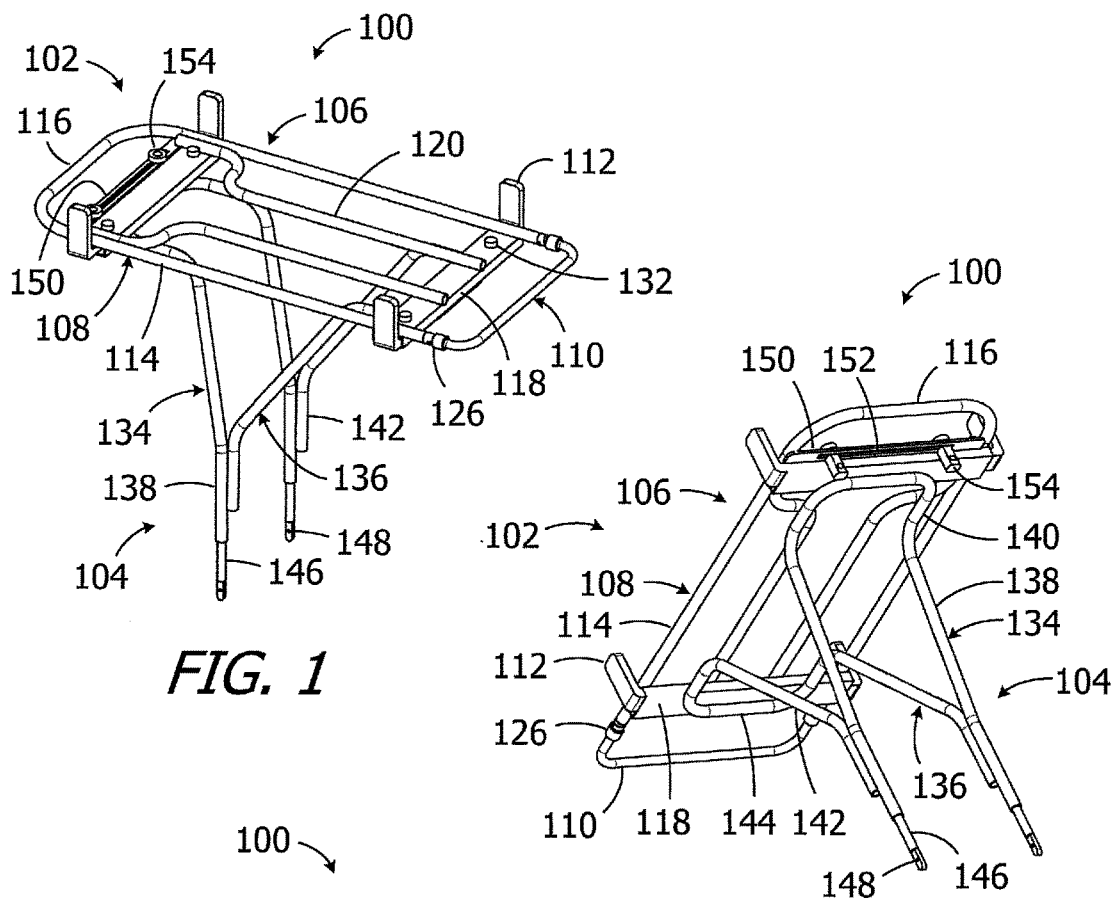

ADJUSTABLE BICYCLE RACK

BACKGROUND

1. Field

The present inventions relate generally to racks that may be used to secure objects to bicycles and other two-wheeled or three-wheeled vehicles.

2. Description of the Related Art

Bicycles, which are a common form of transportation and include both two and three-wheeled versions, frequently include racks that allow objects to be secured to the bicycle. Such racks include a platform on which one or more objects may be supported and a platform support that mounts the platform onto the bicycle above the front wheel or the rear wheel. Various types of straps and cords, both elastic and inelastic, can be used to secure the object(s) to the platform. Some racks include an adjustable platform support allow the rack to be mounted on differently sized and shaped bicycles. The present inventor has determined that although conventional bicycle racks are useful, they are also susceptible to improvement. For example, the present inventor has determined that conventional bicycle racks include platforms that are not well-suited for conveying objects of varying sizes. Objects such as musical instrument cases, suitcases, and backpacks tend to extend over the sides and/or ends of the racks, and securing objects that extend over the sides and/or ends of a rack with bungie cords, cable ties, or the like tends to be inconvenient, unreliable and unsafe. Although some racks are configured for use with relatively large objects, such as a surfboard, these racks are configured solely for use with a particular object and are not well-suited to use with other objects, be those objects large or small. Another proposed solution involves the use of pannier bags (sometimes referred to as "saddlebags") that hang from a conventional rack. Such pannier bags are, however, also sold in particular sizes and shapes, which is limiting, and are sometimes even configured for a particular purpose or object.

SUMMARY

A rack for use with a two or three-wheeled vehicle in accordance with one embodiment of a present invention comprises a platform defining a length and a width, at least one of the length and the width of the platform being adjustable, and a platform support, operably connected to the platform, configured to be secured to the two or three-wheeled vehicle.

A rack system for use with a two or three-wheeled vehicle in accordance with one embodiment of a present invention comprises a platform, including a frame with a base portion and a distal end portion that is configured to be removably secured to the base portion, and at least one laterally movable member that is movable relative to the base portion in one direction to increase the width of the platform and in another direction to decrease the width of the platform, a platform support configured to be secured to the two or three-wheeled vehicle, and a frame extension that is configured to be removably secured to the base portion such that the frame extension is longitudinally movable relative to the base portion in a first length direction to increase the length of the platform and in a second length direction to decrease the length of the platform. The respective configurations of the base portion, the distal end portion and the frame extension are such that only one of the distal end portion and the frame extension may be secured to the base portion at a time The present inventions also include both two-wheeled bicycles and three-wheeled bicycles in combination with such racks and rack systems.

There are a number of advantages associated with the present inventions. By way of example, but not limitation, that ability to adjust the length and/or width of the rack platform allows the present racks to safely accommodate objects of varying size. For example, the rack may be adjusted to accommodate objects such as musical instrument cases, suitcases, coolers, and backpacks conveniently and safely. The present racks will also support a pannier bag if so desired. In some embodiments, the rack may include one or more laterally movable members. In addition to facilitating adjustment of the rack width, the laterally movable members may function as hooks from which objects (including relatively long objects such as a golf club bag or a surfboard) may be suspended while other objects are supported on top of the rack.

The features of the present inventions will become apparent as the inventions become better understood by reference to the following detailed description when considered in conjunction with the accompanying drawings.

BRIEF DESCRIPTION OF THE DRAWINGS

Detailed description of embodiments of the inventions will be made with reference to the accompanying drawings.

FIG. 1 is a top perspective view of a bicycle rack in accordance with one embodiment of a present invention.

FIG. 2 is a bottom perspective view of the bicycle rack illustrated in FIG. 1.

FIG. 3 is an exploded top perspective view of the bicycle rack illustrated in FIG. 1.

DETAILED DESCRIPTION

Figure 4:
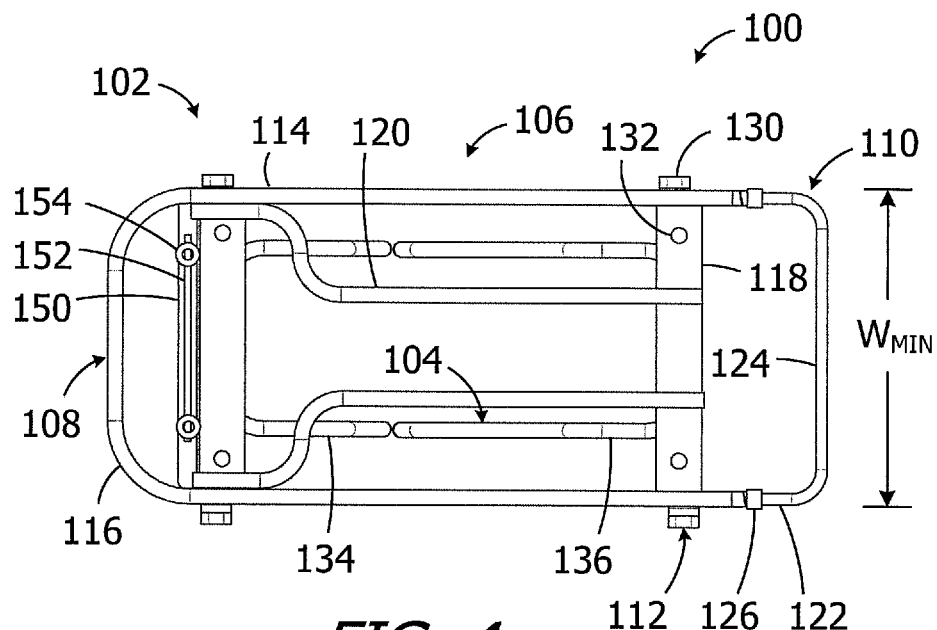
FIG. 4 is a top view of the bicycle rack illustrated in FIG. 1 with the laterally movable members in a retracted state.

The following is a detailed description of the best presently known modes of carrying out the inventions. This description is not to be taken in a limiting sense, but is made merely for the purpose of illustrating the general principles of the inventions.

As illustrated for example in FIGS. 1-4, the exemplary rack 100 includes a platform 102 and a platform support 104. As discussed in greater detail below, the width and/or length of the platform 102 may be selectively increased from the state illustrated in FIGS. 1-4, thereby enabling the exemplary rack 100 to accommodate objects of varying sizes, shapes and weights. As used herein, the longitudinal direction is the wheel-to-wheel direction of the associated bicycle, and length is measured in the longitudinal direction. The lateral direction is perpendicular to the longitudinal direction, and width is measured in the lateral direction. The words "proximal" and "distal" are used with reference to the bicycle seat upon which the rider sits. For example, the proximal end of an object is the end that is closest to the bicycle seat and the distal end is the end that is farthest from the bicycle seat.

The exemplary platform 102 includes a frame 106, with base portion 108 that is secured to the platform support 104 and a removable distal end portion 110, and a plurality of (e.g., four) laterally movable members 112. The base portion 108 in the exemplary implementation includes a pair of outer members 114, a proximal end member 116 that extends from one outer member to the other, first and second movable member guides 118 that extend laterally from one outer member to the other, and interior members 120 that extend from one movable member guide to the other. The outer members 114, movable member guides 118, and interior members 120 in the illustrated embodiment are tubular structures with inner lumens in which various components are received.

To that end, the distal end portion 110 in the illustrated implementation includes a pair of outer members 122, which are configured to be inserted into the outer members 114 of the base portion 108, and a distal end member 124. One or more locks 126, which are discussed in greater detail below with reference to FIG. 5, may be provided to secure the outer members 122 of the distal end portion 110 to the outer members 114. The laterally movable members 112 are configured to be respectively inserted into one of the lateral ends of the movable member guides 118. Each laterally movable member 112 includes a horizontal portion 128, which may be inserted into a movable member guide 118, and a vertical portion 130. A plurality of locks 132, which are discussed in greater detail below with reference to FIG. 5, may be provided to fix the respective positions of the laterally movable members 112 when in a locked state and to permit movement of the laterally movable members when in an unlocked state. As a result, the laterally movable members 112 are independently movable relative to the frame 106.

One or more of the laterally movable members 112 may be removed from the rack 100 to, for example accommodate objects that require such removal. One or more of the laterally movable members 112 may also be replaced with differently sized and/or shaped laterally movable members. For example, the length of the horizontal portion 128 may be increased or decreased, and/or the length of the vertical portion 130 may be increased or decreased and/or the angle between the horizontal and vertical portions may be increased or decreased.

The exemplary platform support 104 includes support members 134 and 136. The support member 134 includes a pair of upwardly extending legs 138 that are joined by a seat 140, while the support member 136 includes a pair of upwardly extending legs 142 that are joined by a seat 144. The legs 138 and 142 are attached to one another, while at least a portion of each of the seats 140 and 144 is secured to a respective one of the movable member guides 118. The exemplary platform support 104 may also include telescoping end portions 146 which project from the upwardly extending legs 142 of the support member 136 and are held in place with set screws (not shown), thereby allowing the height of the platform support to be adjusted to accommodate bicycles of varying size. A pair of apertures 148 may be used mount the platform support 104 and, therefore, the exemplary rack 100, onto a bracket in the manner described below with reference to FIGS. 11-13.

In some implementations, the rack may also be provided with structures that facilitate connection to a portion of a bicycle frame. For example, the rack includes a bracket 150, with a slot 152, and anchors 154 that are located in the slot. The anchors 154 may be secured to a portion of the bicycle frame in the manner described below with reference to FIGS. 11-13.

Figure 5:
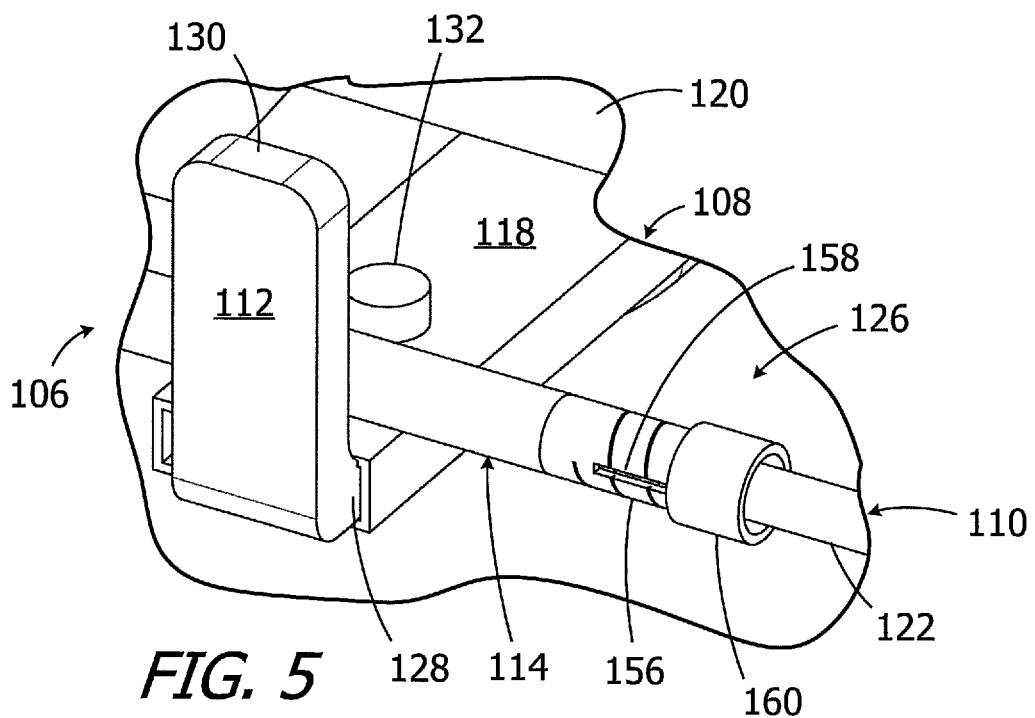
FIG. 5 is an enlarged view of a portion of FIG. 1.

Referring to FIG. 5, and although the present inventions are not limited to any particular types of locks, each exemplary lock 126 consists of a threaded portion 156 of the associated outer member 114, one or more slots 158 that allow the threaded portion to be compressed, and a threaded nut 160 that is rotatably mounted on the threaded portion 156. The respective inner and outer diameters of the outer members 114 and 122 are such that the distal end portion 110 may be removed from the base portion 106 when the threaded portions 156 are not compressed (as shown in FIG. 5). Clockwise rotation of the nuts 160 causes the nuts to move in the tightening direction (leftward in the illustrated orientation), thereby causing the threaded portions 156 to compress and frictionally engage the outer members 122 and prevent removal of the distal end portion 110.

Turning to the locks that may be used to selectively permit and prevent movement of the laterally movable members 112, the exemplary locks 132 may be in the form of set screws that extend through apertures (not shown) in the movable member guides 118. The set screws 132 each frictionally engage the horizontal portion 128 of a respective one of the laterally movable members 112 when in a locked state, thereby preventing movement of the associated laterally movable member.

Figure 6:
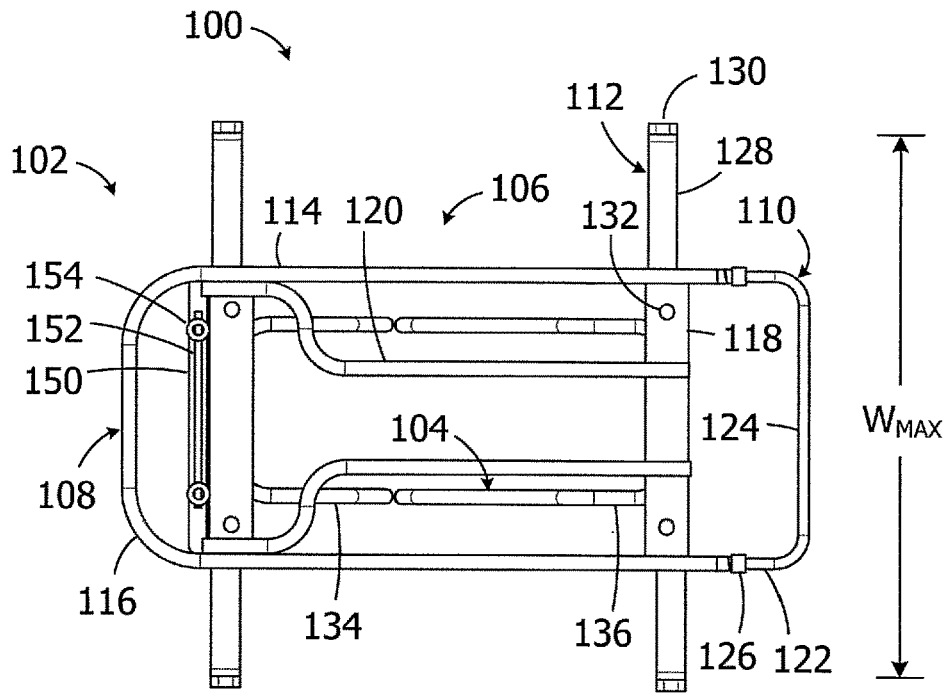
FIG. 6 is a top view of the bicycle rack illustrated in FIG. 1 with the laterally movable members in an extended state.

As noted above, the width of the exemplary platform 102 may be adjusted so as to accommodate differently sized loads. In the illustrated implementation, the width of the platform 102 is the distance between the vertical portions 130 of the laterally movable members 112 on the same guide 118. The minimum width $W_{MIN}$, where each of the laterally movable members 112 is in its fully retracted position, is shown in FIG. 4. The maximum width $W_{MAX}$, where each of the laterally movable members 112 is in its fully extended position, is shown in FIG. 6. It should also be noted that the width of the platform 102 may be non-uniform along the length of the platform because each of the laterally movable members 112 (and its associated lock 132) operated independently of the others. For example, the distance between the proximal laterally movable members 112 (i.e., those closest to the base portion proximal end member 116) may be different than the distance between the distal laterally movable members (i.e., those closest to the distal end portion 110). Alternatively, or in addition, the distance between the vertical portion 130 of a laterally movable member 112 and the adjacent outer member 114 may be different for two laterally movable members on the same guide 118.

The length of the exemplary platform 102 may also be adjusted so as to accommodate differently sized and shaped loads. In the illustrated implementation, the length of the frame 106, i.e., the combined length of the base portion 108 and a removable distal end portion 110, may be adjusted slightly unlocking the locks 126 and moving the distal end portion relative to the base portion to the extent permitted by the length of the distal end portion outer members 122 (FIG. 3).

Figure 7:
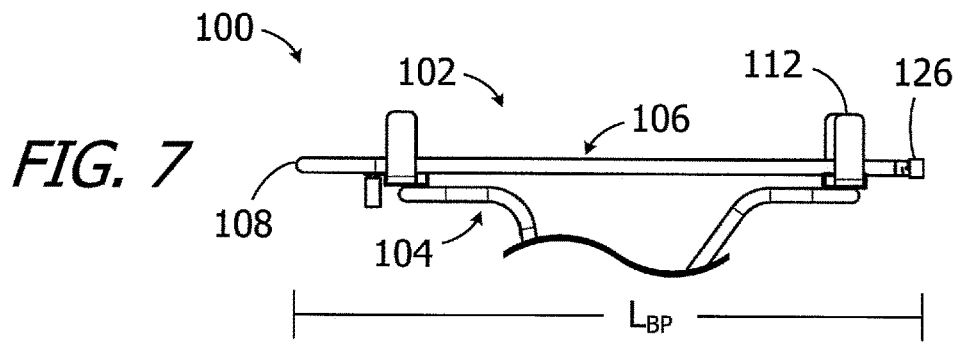
FIG. 7 is a side view of a portion of the bicycle rack illustrated in FIG. 1.
Figure 8:
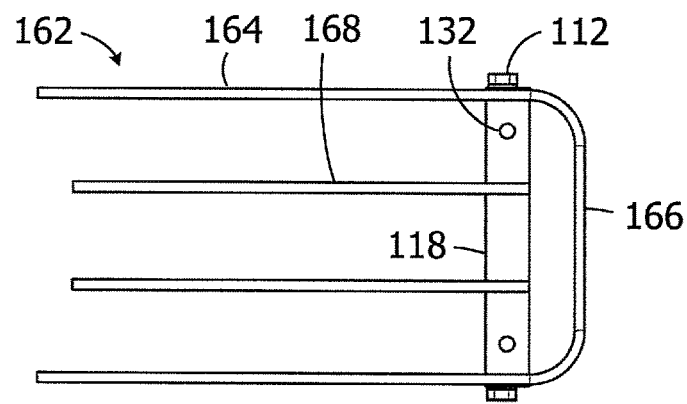
FIG. 8 is a top view of a frame extension in accordance with one embodiment of a present invention.

Length adjustments of greater magnitude may be accomplished in the illustrated implementation by removing the distal end portion 110 of the frame 106 (FIG. 7), and replacing the distal end portion with a frame extension such as the exemplary frame extension 162 illustrated in FIG. 8. The frame extension 162 may be operably connected to the frame base portion 108 to form the modified frame 106a (and modified rack 100a) discussed below with reference to FIGS. 9 and 10. The exemplary frame extension 162 includes a pair of outer members 164, a distal end member 166 that extends from one outer member to the other, a pair of laterally movable members 112, a movable member guide 118 that extends from one outer member to the other, and interior members 168 that extend from the movable member guide. Here too, locks 132 allow the user to selectively reposition (or remove or replace) the laterally movable members 112.

The respective configurations of the frame base portion 108 and the frame extension 162 are such that the extension outer members 164 can be inserted into the base portion outer members 114 and the extension interior members 168 can be inserted into the base portion interior members 120. For example, in those instances where the inner lumens of the outer and interior members 114 and 120 of the frame base portion 108 are circular, the outer and interior members 164 and 168 of the frame extension 162 may be hollow tubes or solid rods that are circular in cross-section.

Figure 9:
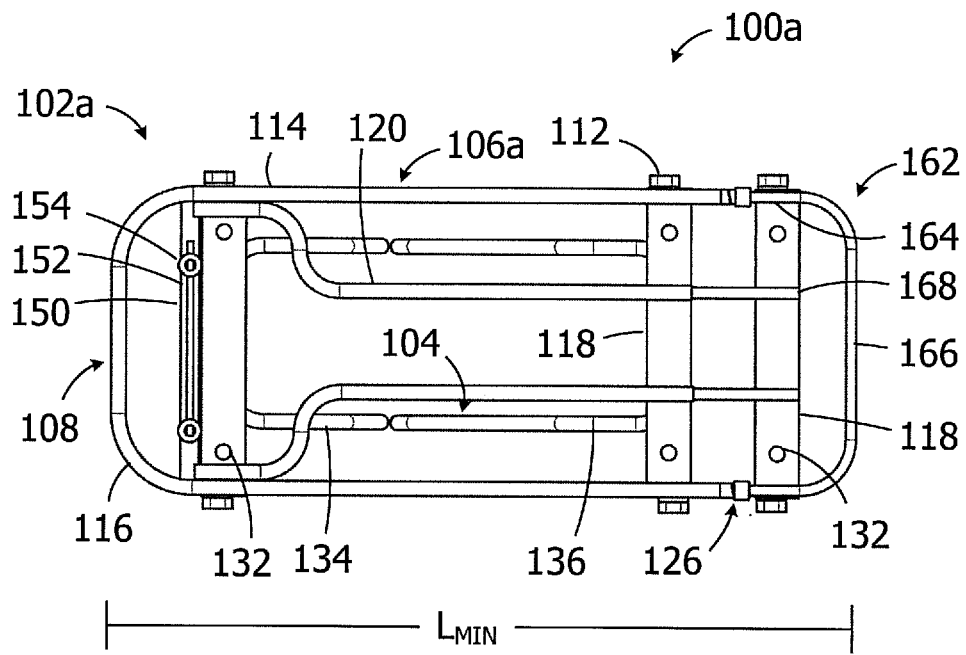
FIG. 9 is a top view of a bicycle rack including the frame extension illustrated in FIG. 8 in a retracted state.
Figure 10:
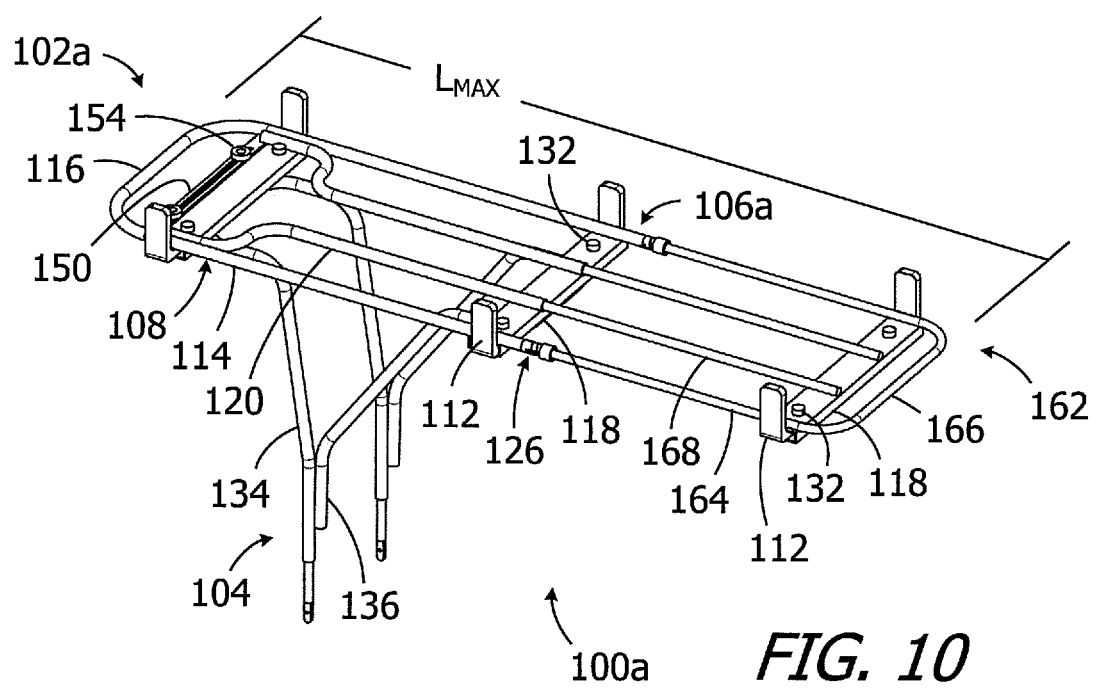
FIG. 10 is a top perspective view of a bicycle rack including the frame extension illustrated in FIG. 8 in an extended state.

FIGS. 9 and 10, the exemplary modified rack 100a is substantially similar to rack 100 and similar elements are represented by similar reference numerals. Here, however, the platform 102a has a frame 106a that includes the base portion 108 and the frame extension 162. The locks 126 fix the position of the frame extension 162 relative to the portion 108 when in a locked state and permit movement of the frame extension when in an unlocked state. As a result, the frame 106a (and platform 102a) has minimum length $L_{MIN}$, where the frame extension 162 is in its fully retracted position (FIG. 9) and maximum length $L_{MAX}$, where the frame extension 162 is in its fully extended position (FIG. 10). The frame extension 162 may also be locked anywhere between the fully retracted and extended positions.

Although the present inventions are not limited to any particular dimensions and materials, the platform 102 may, depending upon the intended application, have a minimum width $W_{MIN}$ that ranges from 10 inches to 16 inches and is 10 inches in the exemplary embodiment, and may have a maximum width $W_{MAX}$ that ranges from 17 inches to 28 inches and is 17 inches in the exemplary embodiment. The length $L_{BP}$ (FIG. 7) of the platform base portion 108 may ranges from 19 to 28 and is 20 inches in the exemplary embodiment. Turning to the platform 102a with the frame extension 162, the platform may have a minimum length $L_{MIN}$ that ranges from 21.5 inches to 30.5 inches and is 21.5 inches in the exemplary embodiment, and may have a maximum length $L_{MAX}$ that ranges from 30 inches to 42 inches and is 30 inches in the exemplary embodiment. In those instances where the rack is intended to be mounted on the front or rear of a three-wheeled bicycle, the exemplary dimensions may be adjusted accordingly. Suitable materials for the present racks include, but are not limited to, aluminum, steel, composites and plastics. Also, different portions of the same rack may be formed from different materials. For example, the vast majority of a rack may be formed from aluminum or steel, while the locks may be formed from plastic.

Figure 11:
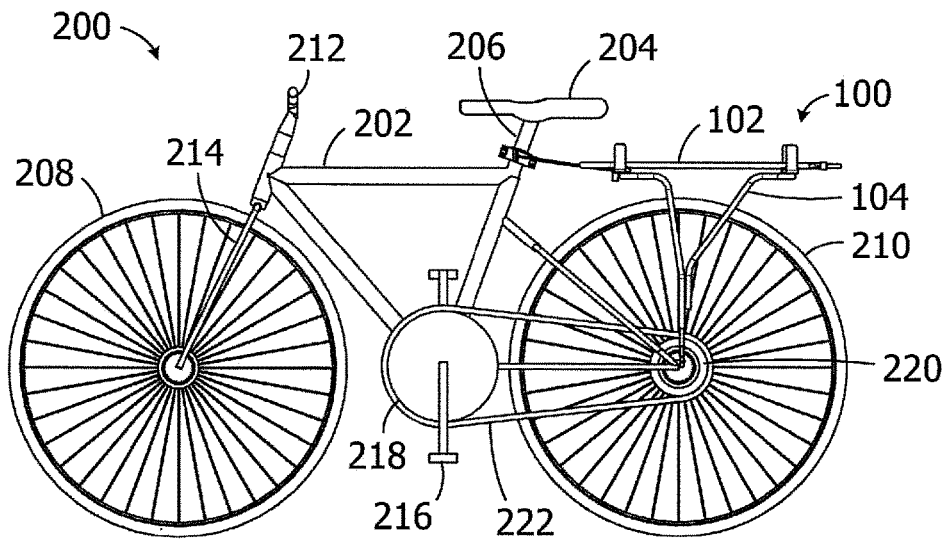
FIG. 11 is a side view of a bicycle in accordance with one embodiment of a present invention.
Figure 12:
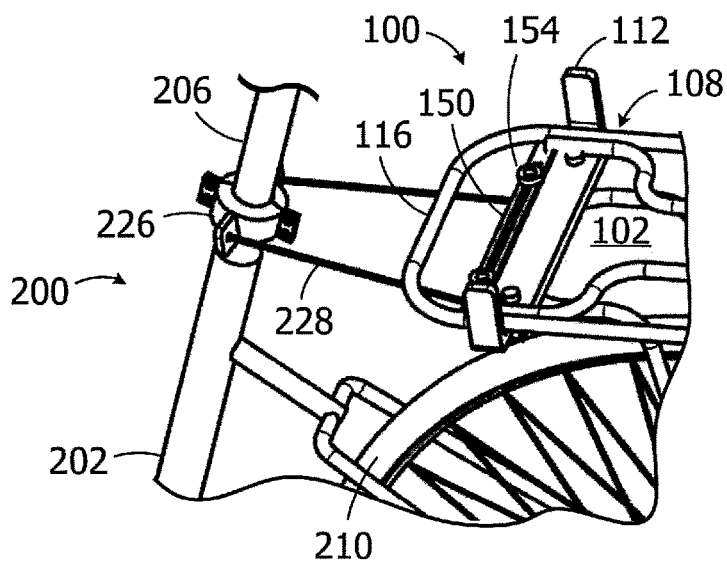
FIG. 12 is a perspective view of a portion of the bicycle illustrated in FIG. 11.
Figure 13:
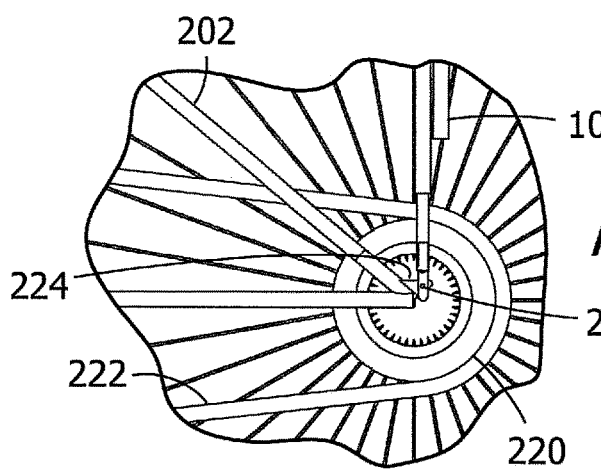
FIG. 13 is an enlarged view of a portion of FIG. 11.

Turning to FIGS. 11-13, the exemplary rack 100 (or 100a) may be mounted on, and incorporated into, a bicycle 200. The exemplary bicycle includes convention structures such as a frame 202, a seat 204, a seat post 206 that positions the seat over the frame, front and rear wheels 208 and 210, and a handle bar 212 that is connected to the front wheel by forks 214. The rear wheel 210 may be driven by way of pedals 216, front and rear sprockets 218 and 220, and a chain 222. The frame 202 includes a rack connection bracket 224 (FIG. 13).

Referring more specifically to FIG. 12, an anchor bracket 226 may be secured to the bicycle frame 202 adjacent to the seat post 206. Connector rods 228 may be used to connect the anchor bracket 226 to the anchors 154 on the rack 100, thereby connecting the platform 102 to the bicycle 200. Turning to FIG. 13, the platform support 104 may be connected to the bracket 224 by way of the apertures 148 (FIG. 3) and fasteners 226, thereby connecting the platform support 104 to the bicycle 200.

Although the present inventions have been described in terms of the preferred embodiments above, numerous modifications and/or additions to the above-described preferred embodiments would be readily apparent to one skilled in the art. By way of example, but not limitation, the present racks may be configured for placement over the front wheel. The present racks may also be configured for mounting on two-wheeled vehicles other than bicycles (e.g., mopeds, scooters, and e-bikes) as well as three-wheeled bicycles and other three-wheeled vehicles. References herein to a "two or three-wheeled vehicle" encompass both vehicles with two wheel and vehicles with three wheels, and excludes vehicles with less than two wheels and more than three wheels. The present inventions also include systems having a bicycle and a rack (or rack system) as claimed in any one of claims below. It is intended that the scope of the present inventions extend to all such modifications and/or additions.

I claim:

1. A rack system for use with a two or three-wheeled vehicle, comprising:
    a platform including
        a frame with a base portion and a distal end portion that is configured to be removably secured to the base portion at a location on the base portion, and
        at least one laterally movable member that is movable relative to the base portion in one direction to increase the width of the platform and in another direction to decrease the width of the platform;
    a platform support, operably connected to the platform, configured to be secured to the two or three-wheeled vehicle; and
    a frame extension that is configured to be removably secured to the base portion at the location on the base portion in place of the distal end portion such that the frame extension is longitudinally movable relative to the base portion in a first length direction to increase the length of the platform and in a second length direction to decrease the length of the platform;
    wherein the respective configurations of the base portion, the distal end portion and the frame extension are such that only one of the distal end portion and the frame extension may be secured to the base portion at a time.

2. A rack system as claimed in claim 1, wherein
    the platform includes at least one lock having a locked state that prevents removal of the distal end portion and movement and removal of the frame extension and an unlocked state that permits removal of the distal end portion and movement and removal of the frame extension.

3. A rack system as claimed in claim 2, wherein
the platform includes a laterally extending guide that is secured to the frame base portion; and
the at least one laterally movable member comprises first and second laterally movable members that are carried by, and independently slidable relative to, the laterally extending guide.

4. A rack system as claimed in claim 3, wherein
the platform includes at least one lock having a locked state that prevents movement of the laterally movable members and an unlocked state that permits movement of the laterally movable members.

5. A rack system as claimed in claim 1, wherein
the two or three-wheeled vehicle comprises a bicycle.

* * * * *